(12) United States Patent
Wagner

(10) Patent No.: US 7,752,507 B2
(45) Date of Patent: *Jul. 6, 2010

(54) CIRCUIT ARRANGEMENT AND METHOD FOR SUPPORTING AND MONITORING A MICROCONTROLLER

(75) Inventor: Martin Wagner, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/410,055

(22) Filed: Mar. 24, 2009

(65) Prior Publication Data

US 2009/0187792 A1 Jul. 23, 2009

Related U.S. Application Data

(63) Continuation of application No. 10/569,185, filed as application No. PCT/IB2004/051466 on Aug. 17, 2004, now Pat. No. 7,529,983.

(30) Foreign Application Priority Data

Aug. 27, 2003 (EP) .................................. 03102658

(51) Int. Cl.
*G06F 11/00* (2006.01)

(52) U.S. Cl. ............................ 714/55; 714/34; 714/51

(58) Field of Classification Search ........................ None
See application file for complete search history.

(56) References Cited

U.S. PATENT DOCUMENTS

| | | | |
|---|---|---|---|
| 4,809,280 A * | 2/1989 | Shonaka | 714/55 |
| 5,408,643 A * | 4/1995 | Katayose | 714/55 |
| 5,542,076 A * | 7/1996 | Benson et al. | 710/260 |
| 5,644,702 A * | 7/1997 | Nishioka | 714/22 |
| 5,652,836 A * | 7/1997 | Park | 714/55 |
| 6,012,154 A * | 1/2000 | Poisner | 714/55 |
| 6,260,162 B1 * | 7/2001 | Typaldos et al. | 714/55 |
| 6,505,298 B1 * | 1/2003 | Cerbini et al. | 713/1 |
| 7,178,070 B2 * | 2/2007 | Pihet et al. | 714/55 |
| 7,200,781 B2 * | 4/2007 | Mantey et al. | 714/53 |
| 7,287,198 B2 * | 10/2007 | Foerstner et al. | 714/55 |
| 7,529,983 B2 * | 5/2009 | Wagner | 714/55 |
| 2003/0204792 A1 * | 10/2003 | Cahill et al. | 714/55 |
| 2007/0006030 A1 * | 1/2007 | Wagner | 714/25 |

OTHER PUBLICATIONS

FOLDOC. "Circuit". foldoc.org/query=circuit.*

* cited by examiner

*Primary Examiner*—Yolanda L Wilson

(57) ABSTRACT

A circuit arrangement for supporting and monitoring a microcontroller, which is constructed externally of the microcontroller, comprises a watchdog circuit for monitoring the microcontroller, which circuit outputs an error signal if not reset by the microcontroller within a watchdog period, and an interrupt circuit, which feeds important system messages to the microcontroller as interrupt events for processing. In order correctly to combine interrupt processing and watchdog operation, the watchdog circuit is connected to the interrupt circuit and cooperates therewith in such a way that the interrupt circuit feeds at most a predetermined number of interrupt events to the microcontroller within a watchdog period.

17 Claims, 1 Drawing Sheet

CIRCUIT ARRANGEMENT AND METHOD FOR SUPPORTING AND MONITORING A MICROCONTROLLER

RELATED PATENT DOCUMENTS

Figure 1:
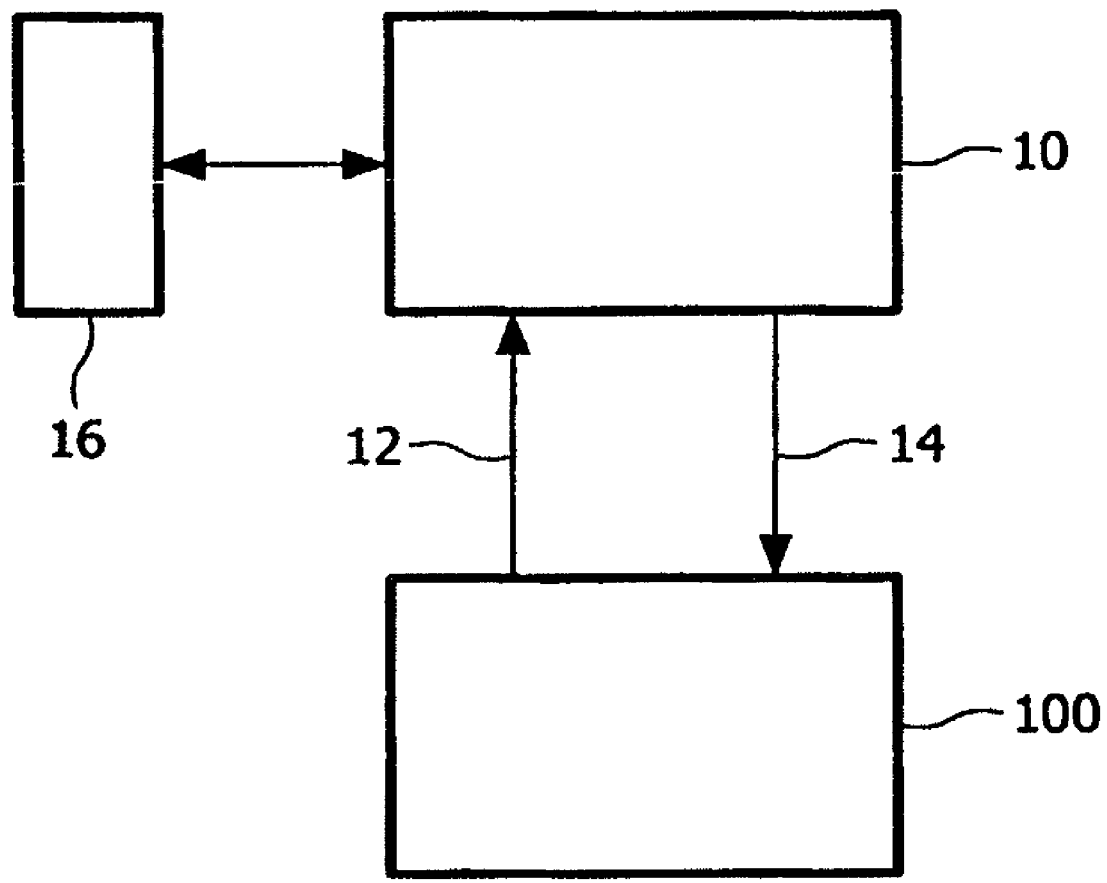

This patent document is a continuation under 35 U.S.C. §120 of U.S. patent application Ser. No. 10/569,185 filed on Feb. 22, 2006, now U.S. Pat. No. 7,529,983 which is a 35 U.S.C. §371 national stage entry of International Application No. PCT/IB2004/051466 filed on Aug. 17, 2004,which claims priority benefit under 35 U.S.C. §119 of Great Britain Patent Application No. 03102658.6 filed on Aug. 27, 2003, to which priority is also claimed here.

The invention relates to a circuit arrangement and a method for supporting and monitoring a microcontroller. The circuit arrangement is constructed externally of the microcontroller and comprises a watchdog circuit for monitoring the microcontroller, which circuit outputs an error signal if not reset by the microcontroller within a watchdog period, and an interrupt circuit, which feeds important system messages to the microcontroller as interrupt events for processing.

These days, the software in modern control devices or microcontrollers, especially in the automotive industry, is monitored as a rule by a so-called watchdog circuit or reset circuit. In error-free operation, the watchdog circuit is regularly reset within a given time window, the watchdog period, by the control device or the microcontroller. If this does not happen, an error is detected and the watchdog circuit outputs a corresponding error signal. The error signal may, for example, trigger a restart of the control device or of the microcontroller.

Consequently, the software of the control device must not exceed a given maximum running time within the watchdog period. In this respect, the processing of unforeseeable events, such as those involving interrupts for example, is problematic. In order to ensure that the maximum running time is complied with, the software designer may for example limit the number of interrupts which are handled per watchdog period.

If a plurality of interrupts occur within one watchdog period, it may be the case that the last interrupts have to wait until the beginning of the next watchdog period. Direct processing of the interrupts is not possible, due to the unforeseeable nature of the events. The risk therefore arises of very urgent interrupt events, such as for example the impending loss of supply voltage, no longer being handled in time, so meaning that important system information or data may be lost.

In principle, there are two different methods for a microprocessor to process incoming messages. With the so-called polling method, the messages directed to the microprocessor are stored in a buffer and the processor regularly checks to see whether a message has arrived which needs processing. This method has the disadvantage that, if the processor checks the buffer relatively seldom, a long time may pass between the arrival of a message and the processing thereof. If, on the other hand, the processor checks relatively frequently, the response time to the message is shortened, but heavy demands are made on the processor's computing time by the frequent checking, such that less time remains for other tasks.

In a second method, the incoming messages trigger an interrupt, which interrupts the program the processor is running in order to process the message which has been received. This method has the advantage that the response time to a message is very short, and that the processor is only occupied with processing a message when a message is actually present. A disadvantage, however, is that the program which is running is constantly interrupted if messages arrive relatively frequently.

In order to be able to exchange messages efficiently in a multiprocessor environment, the article "Polling Watchdog: Combining Polling and Interrupts for Efficient Message Handling", O. Maquelin, G. R. Gao, H. H. J. Hum, K. B. Theobald, and X. Tian, 23rd Annual International Symposium on Computer Architecture, pages 179-188, Philadelphia, Pa., U.S.A., May 1996, proposes to eliminate the disadvantages of the two methods described above by reading out incoming messages regularly according to the polling method and starting a watchdog at the same time as each message arrives, which watchdog ensures that the response time to a message which has been received does not exceed a set amount. If the message is processed in good time, the watchdog is stopped. Otherwise, the watchdog triggers an interrupt, which forces the processor to process the message immediately. In this way, the processor workload is kept low and at the same time it is ensured that the response time to a message does not exceed a given amount.

U.S. Pat. No. 6,505,298 B1 discloses a device which makes it possible to monitor an operating system by means of a watchdog. The watchdog periodically starts an interrupt routine, which may establish by access to a particular register whether the operating system is still operating properly. If this is not the case, the computer is reset. Special interrupt control is not proposed in this patent specification.

It is an object of the invention to provide an improved control circuit of the above-stated type with which interrupt processing and watchdog operation may be correctly combined.

This object is achieved by the control circuit having the features indicated in claim 1 or claim 2 and the method having the method steps indicated in claim 9 or claim 10.

According thereto, the invention consists, in a first aspect, in the fact that, in a control circuit of the type discussed above, the watchdog circuit is connected to the interrupt circuit and cooperates therewith in such a way that the interrupt circuit feeds at most a predetermined number of interrupt events to the microcontroller within a watchdog period. The number of interrupts per watchdog period is thereby limited by hardware means.

According to a second aspect, in which the interrupt circuit comprises various interrupt sources, the invention builds on the prior art in that the interrupt sources are assigned to priority classes and in that, for at least one priority class, a predetermined maximum number of interrupt events per watchdog period is set. The watchdog circuit is connected to the interrupt circuit and cooperates therewith in such a way that, for priority classes with a set maximum number, the interrupt circuit feeds at most this maximum number of interrupt events of the associated interrupt sources to the microcontroller within a watchdog period and, for priority classes without a set maximum number, feeds all the interrupt events of the associated interrupt sources to the microcontroller. The number of interrupts per watchdog period is thus limited by hardware means at least for one of the priority classes.

Only a given limited quota of interrupts is thus available to the priority classes with a fixed maximum number. By adding up the maximum number for each class, the software designer may reliably estimate the total number of interrupts per watchdog period.

The occurrence of interrupt events is thereby calculable to a considerable extent, so enabling rapid and direct processing of the interrupts. Assignment of the interrupt sources to different priority classes has the additional advantage that different interrupt groups may be separated from one another, so preventing an individual interrupt source from blocking the entire interrupt system.

Advantageous developments and further embodiments of the invention are revealed by dependent claims 3 to 8.

According to the preferred development of claim 3, the priority classes comprise a maximum priority class, for which no maximum number is set. Particularly urgent interrupts may be assigned to this class, which are still processed quickly enough even when the interrupt quota of all the other classes has already been exhausted.

According to the advantageous measure of claim 4, each interrupt source is assigned either to the maximum priority class or to a second, lower priority class, for which a predetermined maximum number is set. In particular, the maximum number of the second class may be one, such that only a single one of the relatively unimportant interrupts may be triggered per watchdog period. This ensures that the microcontroller may always respond rapidly to the important interrupts of the maximum priority class and is not blocked by the handling of less important interrupts.

According to the advantageous further embodiment of claim 5, the circuit arrangement is a transceiver, which comprises all the peripheral components to constitute a bus node.

In particular, the circuit arrangement may comprise the voltage supply for the microcontroller, as indicated in claim 6.

According to the advantageous filter embodiment as claimed in claim 7, failure of the supply voltage constitutes an interrupt source in the maximum priority class. This measure ensures that the microcontroller may respond to such a failure in good time, even when the maximum number of interrupts from other interrupt sources has already been reached.

According to the expedient development of claim 8, a non-volatile memory is provided in which the microcontroller saves important data in the event of failure of the supply voltage. Since the microcontroller supply is generally buffered by capacitors, if a corresponding interrupt command is processed in good time there is sufficient time available to perform such data saving.

Claims 9 and 10 are directed towards methods of supporting and monitoring a microcontroller according to the first and second aspects of the invention respectively.

The invention will be further described with reference to examples of embodiment shown in the drawings to which, however, the invention is not restricted. The single FIGURE shows a schematic block diagram of a microcontroller, which is supported and monitored by a base chip according to an example of embodiment of the invention.

The single FIGURE is a block diagram of a base chip 100, which supports and monitors a microcontroller 10. The base chip 100 is a transceiver, which comprises all the peripheral components to constitute a bus node, such as watchdog, reset logic and voltage supply for the microcontroller 10. The base chip 100 monitors the software with the watchdog and informs the microcontroller 10, via a data line 12 with the assistance of the interrupts, about important processes in the system.

The watchdog of the base chip 100 is reset by the microcontroller 10 via a connecting line 14 after every watchdog period. If resetting does not occur on time, the watchdog circuit detects an error and outputs a corresponding error signal.

The hardware which may produce interrupts is coupled to the watchdog. The different interrupt sources of this hardware are subdivided into priority classes, in accordance with the invention, each priority class having available to it a given quota of interrupts per watchdog period. Only one maximum priority class, to which the most important interrupt sources are assigned, has an unlimited quota available to it. In this way, the software designer may reliably estimate the total number of interrupts per watchdog period.

An important system message would be failure of the battery voltage, for example. The battery error interrupt is therefore assigned to the maximum priority class and may thus be processed sufficiently quickly even if the interrupt quota of all the other priority classes has already been exhausted. Since the supply of the microcontroller 10 is buffered by capacitors, not shown, important data may in this case still be quickly saved in a non-volatile memory 16.

While the invention has been illustrated and described with particular reference to preferred examples of embodiment, it will be clear to the person skilled in the art that modifications may be made to form and detail without going beyond the concept and scope of the invention. Accordingly, the disclosure of the present invention is not intended to be limiting, but instead to illustrate the scope of the invention as set out below in the claims.

LIST OF REFERENCE NUMERALS

10 Microcontroller
12 Data line to microcontroller
14 Connecting line for resetting watchdog
16 Non-volatile memory
100 Base chip

The invention claimed is:

1. A circuit arrangement for supporting and monitoring a microcontroller and external to the microcontroller, comprising:
　a watchdog circuit configured and arranged to
　　implement a watchdog period that is reset by a signal from the microcontroller;
　　during a watchdog period, allow interrupts to be sent to the microcontroller up to and including a predetermined number of interrupts, the number being greater than one, and prevent interrupts in excess of the predetermined number from being sent to the microcontroller;
　　generate an error signal in response to a watchdog period expiring; and
　　from a plurality of classes of the interrupts, identify, for one of the interrupts, a priority class of the plurality of priority classes and to limit the interrupts sent to the microcontroller based upon the identified priority class.

2. The circuit arrangement of claim 1, wherein the watchdog circuit is further configured and arranged
　to identify interrupts according to
　　a first one of the priority classes indicating a battery voltage failure and having no limit on the number of the interrupts sent to the microcontroller during a watchdog period,
　　a second one of the priority classes to limit on the interrupts sent to the microcontroller to a first number of interrupts that is greater than one, and
　　a third one of the of the priority classes to limit on the interrupts sent to the microcontroller to a second number of interrupts that is greater than one; and
　to limit a total number of interrupts the number of interrupts sent to the microcontroller during a watchdog period, the total number of interrupts representing all interrupts other than those identified for the first one of the priority classes.

3. The circuit arrangement of claim 1, wherein the watchdog circuit is further configured and arranged to identify, for an interrupt, a priority class of a plurality of priority classes, at least two of the priority classes having different limits on the number of the interrupts sent to the microcontroller during a watchdog period.

4. The circuit arrangement of claim 1, wherein the watchdog circuit is further configured and arranged to identify, for an interrupt, a priority class of a plurality of priority classes, at least one of the priority classes indicating a supply voltage failure and having no limit on the number of the interrupts sent to the microcontroller during a watchdog period.

5. The circuit arrangement of claim 1, wherein the watchdog circuit is further configured and arranged to identify, for an interrupt, a priority class of a plurality of priority classes, at least one of the priority classes indicating a battery voltage failure and having no limit on the number of the interrupts sent to the microcontroller during a watchdog period.

6. The circuit arrangement of claim 1, wherein the watchdog circuit is further configured and arranged to identify, for an interrupt, a priority class of a plurality of priority classes, at least one of the priority classes indicating a battery voltage failure and having no limit on the number of the interrupts sent to the microcontroller during a watchdog period.

7. A method for supporting and monitoring a microcontroller, comprising:

monitoring the microcontroller by enabling a watchdog circuit that outputs an error signal if not reset by the microcontroller within a watchdog period, and sending system messages to the microcontroller as interrupt events for processing, during a watchdog period, allowing interrupts to be sent to the microcontroller up to and including a predetermined number of interrupts, the number being greater than one, and preventing interrupts in excess of the predetermined number from being sent to the microcontroller, and from a plurality of priority classes of the interrupts, identifying, for one of the interrupts, a priority class from the plurality of priority classes and limiting the number of interrupts sent to the microcontroller based upon the identified priority class.

8. The method of claim 7, further including the step of identifying interrupts of a first one of the priority classes indicating a battery voltage failure and having no limit on the number of the interrupts sent to the microcontroller during a watchdog period, a second one of the priority classes to limit on the interrupts sent to the microcontroller to a first number of interrupts that is greater than one, and a third one of the of the priority classes to limit on the interrupts sent to the microcontroller to a second number of interrupts that is greater than one; and limiting a total number of interrupts the number of interrupts sent to the microcontroller during a watchdog period, the total number of interrupts representing all interrupts other than those identified for the first one of the priority classes.

9. The method of claim 7, further including the steps of identifying, for a first type of interrupt, a first priority class of a plurality of priority classes, and identifying, for a second type of interrupt, a second priority class of the plurality of priority classes, and limiting interrupts for the first type of interrupt to less than a first number sent to the microcontroller during a watchdog period and the interrupts for the second type of interrupt to less than a second number sent to the microcontroller during a watchdog period, the first and second numbers being different.

10. The method of claim 7, further including the step of identifying, for an interrupt, a priority class of a plurality of priority classes, wherein at least one of the priority classes indicates a supply voltage failure and has no limit on the number of the interrupts sent to the microcontroller during a watchdog period.

11. The method of claim 7, further including the step of identifying, for an interrupt, a priority class of a plurality of priority classes, wherein at least one of the priority classes indicates a battery voltage failure and has no limit on the number of the interrupts sent to the microcontroller during a watchdog period.

12. A system, comprising:

a microcontroller;

a watchdog circuit having an interrupt output for providing an interrupt signal to the microcontroller;

a reset input for receiving a reset signal from the microcontroller;

the watchdog circuit configured and arranged to implement a watchdog period that is reset by a signal from the microcontroller;

during a watchdog period, allow interrupts to be sent to the microcontroller up to and including a predetermined number of interrupts, the number being greater than one, and prevent interrupts in excess of the predetermined number from being sent to the microcontroller;

generate an error signal in response to the current watchdog period expiring, and wherein the watchdog circuit is further configured and arranged to, from a plurality of priority classes of the interrupts, identify, for one of the interrupts, a priority class of the plurality of priority classes and to limit the interrupts sent to the microcontroller based upon the identified priority class.

13. The system of claim 12, wherein the watchdog circuit is further configured and arranged to identify interrupts according to a first one of the priority classes indicating a battery voltage failure and having no limit on the number of the interrupts sent to the microcontroller during a watchdog period, a second one of the priority classes to limit on the interrupts sent to the microcontroller to a first number of interrupts that is greater than one, and a third one of the of the priority classes to limit on the interrupts sent to the microcontroller to a second number of interrupts that is greater than one; and to limit a total number of interrupts the number of interrupts sent to the microcontroller during a watchdog period, the total number of interrupts representing all interrupts other than those identified for the first one of the priority classes.

14. The system of claim 12, wherein the watchdog circuit is further configured and arranged to identify, for an interrupt, a priority class of a plurality of priority classes, at least two of the priority classes having different limits on the number of the interrupts during a watchdog period.

15. The system of claim 12, wherein the watchdog circuit is further configured and arranged to identify, for an interrupt, a priority class of a plurality of priority classes, at least one of the priority classes indicating a supply voltage failure and having no limit on the number of the interrupts sent to the microcontroller during a watchdog period.

16. The system of claim 12, wherein the watchdog circuit is further configured and arranged to identify, for an interrupt, a priority class of a plurality of priority classes, at least one of the priority classes indicating a battery voltage failure and having no limit on the number of the interrupts sent to the microcontroller during a watchdog period.

17. The system of claim 12, wherein the watchdog circuit is further configured and arranged to identify, for an interrupt, a priority class of a plurality of priority classes, at least one of the priority classes indicating a battery voltage failure and having no limit on the number of the interrupts sent to the microcontroller during a watchdog period.

* * * * *